United States Patent [19]
Meline

[11] 3,940,975
[45] Mar. 2, 1976

[54] EXTENSOMETER SUPPORT
[75] Inventor: Harry R. Meline, Minneapolis, Minn.
[73] Assignee: MTS Systems Corporation, Minneapolis, Minn.
[22] Filed: Sept. 9, 1974
[21] Appl. No.: 504,154

[52] U.S. Cl. .................................. 73/103
[51] Int. Cl.². ................................ G01N 3/02
[58] Field of Search .. 73/103, 95; 33/147 D, 148 D; 248/DIG. 4

[56] References Cited
UNITED STATES PATENTS
| | | | |
|---|---|---|---|
| 2,666,262 | 1/1954 | Ruge | 33/148 D |
| 2,910,778 | 11/1959 | Strimel | 33/148 D |
| 3,425,131 | 2/1969 | Hooper | 73/95 X |

*Primary Examiner*—Jerry W. Myracle
*Attorney, Agent, or Firm*—Dugger, Johnson & Westman

[57] ABSTRACT

A support for use with diametral and other types of extensometers to support the weight of the extensometer and also permit the extensometer to move with the specimen in its translational axes without substantial restraint, that is, up, down and in all directions sideways. At the same time the support provides restraint or stiffness in all three axes of rotation of the extensometer.

11 Claims, 6 Drawing Figures

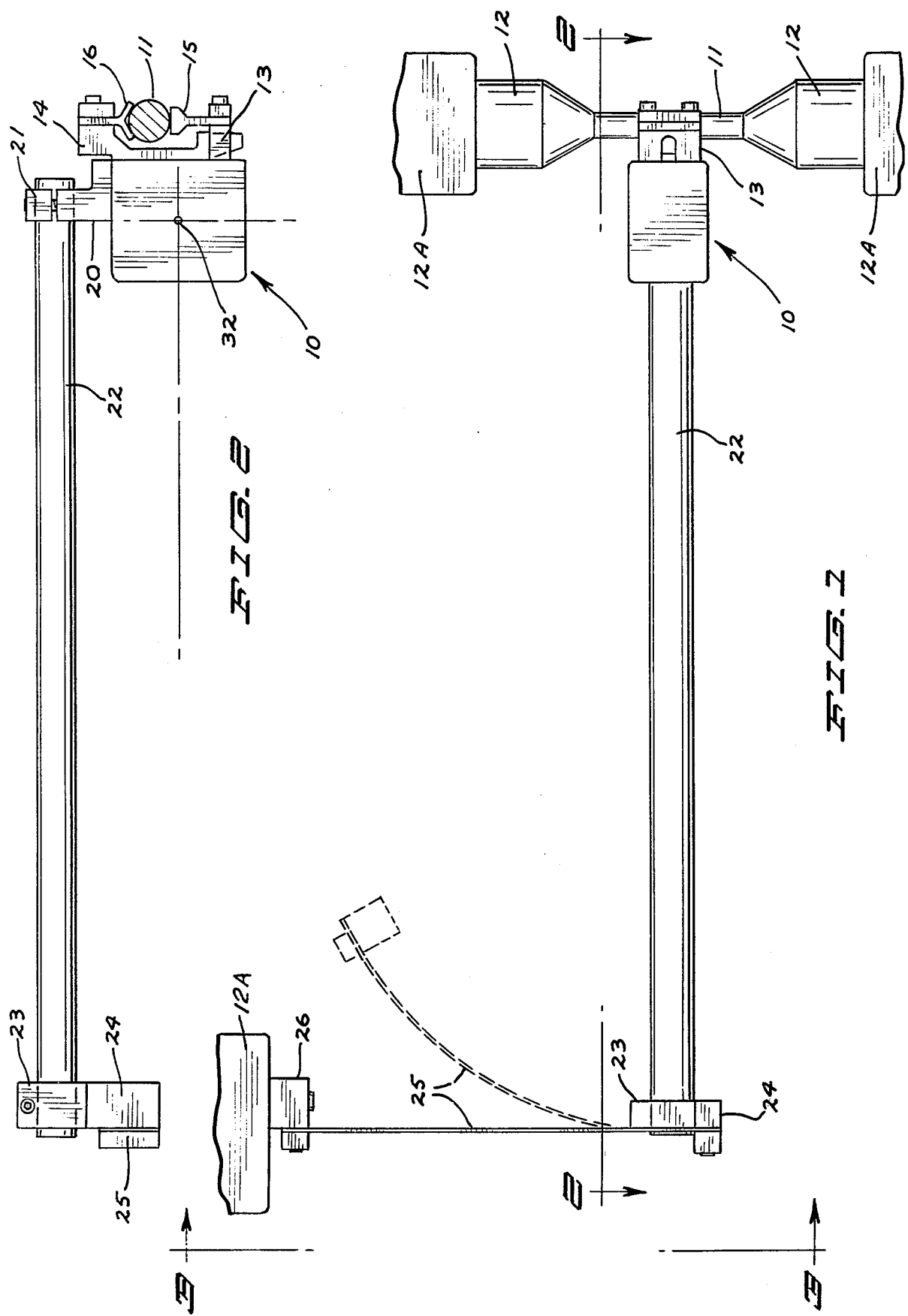

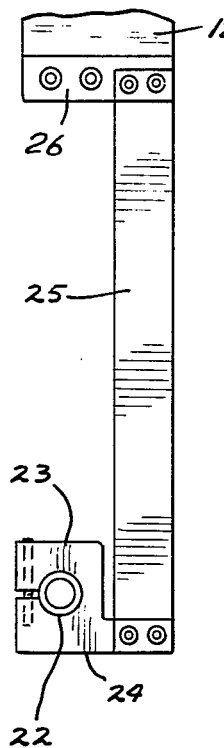
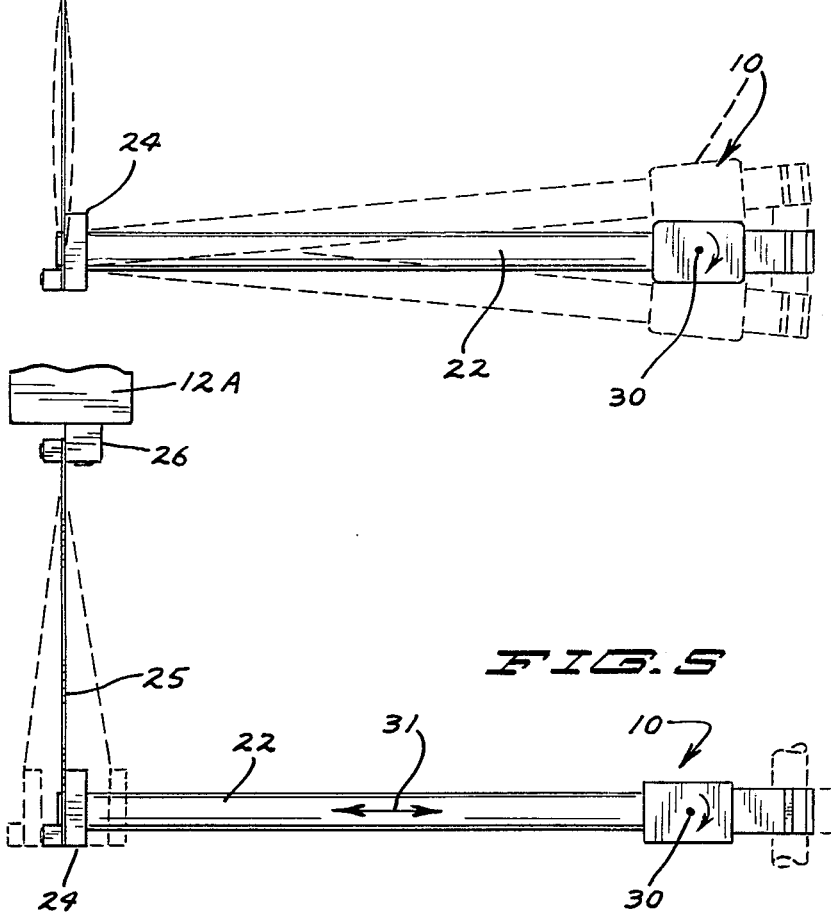
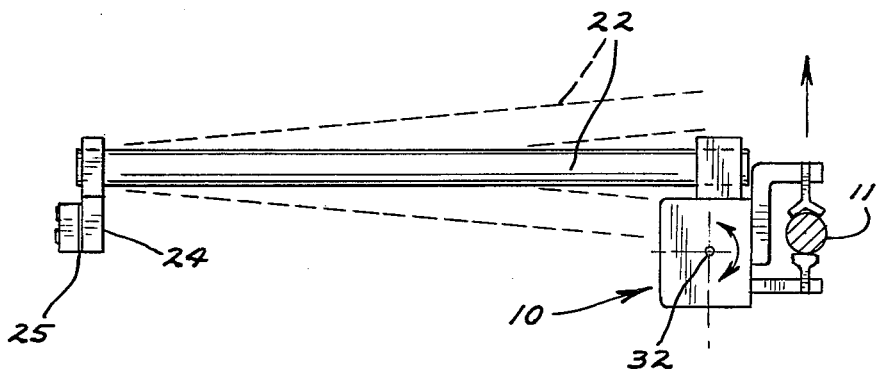

EXTENSOMETER SUPPORT

BACKGROUND OF THE INVENTION

1. Field of Invention

The present invention relates to supports for mounting extensometers used on test specimens.

2. Prior Art

Flexible supports for acceleration devices are shown in U.S. Pat. No. 3,394,381, and such supports are used for isolating or preventing movements in more than one axes. However, the use of a support specifically with an extensometer to permit movement of the extensometer with the specimen tested in three linear axes is not shown in this patent. Additional patents which illustrate the state of the art relating to support members include U.S. Pat. No. 2,724,265; 2,845,794; 3,465,997; 3,714,831; 3,726,986 and 3,735,952.

SUMMARY OF THE INVENTION

The present invention relates to an extensometer support for use with diametral or other types of extensometers, such as circumferential extensometers, that will provide support for the extensometer to relieve the weight of the extensometer on the specimen and will also permit the extensometer to move with the specimen in linear directions, but will provide stiffness to resist undesirable rotation of the extensometer.

The support comprises a mounting flexure strip that is highly flexible, and which has one end mounted onto a support, such as the test machine frame or some other rigid point fixed in relation to the test machine frame. The other end of the thin flexure strip is attached to a block that adjustably mounts a support arm of substantial length, generally at least twice the length of the flexure strip, and the support arm in turn is used for mounting the extensometer itself. The flexure strip provides a spring force tending to maintain the outer end of the arm on which the extensometer is mounted in a preselected position, but will permit the extensometer to move in a plane perpendicular to the plane of the strip, twist about the longitudinal axis of the strip, and bend or flex about an axis transverse to the flexure strip without any substantial restraint. The extension of the flexure strip can either be upwardly or downwardly from the support arm, and a constant radius prebend may be formed into the flexure strip to provide a resilient force tending to support the weight of the extensometer when the flexure strip bends against the curve until it is substantially planar.

The support arm is adjustable in effective length to provide for adjustment of the effective balancing force of the flexure strip.

BRIEF DESCRIPTION OF THE DRAWINGS

FIG. 1 is a side elevational view of an extensometer support made in accordance with the present invention and supporting an extensometer in position on a specimen;

FIG. 2 is a view taken as on line 2—2 in FIG. 1;

FIG. 3 is an end elevational view of the device of FIG. 1 taken as on line 3—3 in FIG. 1;

FIG. 4 is a part schematic side view of the device of FIG. 1 showing a typical movement of the extensometer permitted in up and down direction of the specimen;

FIG. 5 is a part schematic side view of the device of FIG. 4 showing typical movement in axial direction of the support arm; and FIG. 6 is a top view of the device of FIG. 1 showing typical sideways movement of the extensometer permitted with the support of the present invention.

DESCRIPTION OF THE PREFERRED EMBODIMENT

In FIG. 1, an extensometer indicated generally at 10 is mounted onto a specimen 11, that is held in a suitable manner with respect to a test machine shown fragmentarily at 12A. The test machine 12A has test grips 12 that hold the specimen, and stress the specimen in axial direction. The extensometer 10 can be of any usual or preferred design, and as shown is a diametral extensometer. The construction of the extensometer per se does not form as part of the invention, and such extensometers are well known in the art in general configuration. For example, extensometers built and sold by the MTS Sytems Corporation, Eden Prairie, Minn. are usable. Generally, an extensometer includes two arms such as those shown in 13 and 14, that mount specimen engaging members 15 and 16, which contact the specimen. The arms 13 and 14 are pivotally mounted together in a suitable manner (for example see U.S. Pat. No. 3,789,508), and sensing equipment such as strain gages or the like are used to determine when the arms move indicating that the diameter (or other dimension) of the specimen is changing to indicate that yielding is occurring during the test being conducted.

Supporting extensometers on the specimen, particularly diameter and circumference sensing extensometers has long been a problem in that the extensometer should be free to move with the specimen during the test operation without causing any unwanted stresses, which might cause the extensometer to slip, or which may affect the test being conducted on the specimen itself. Generally speaking, when a specimen is stressed along its longitudinal axis as shown in FIG. 1, it will tend to move in its direction along its axes, and in the orthogonal directions perpendicular to its longitudinal axes. Thus, the extensometer should be free to move in up and down directions, and in the orthogonal directions of the horizontal plane. In addition, if the support balances the weight of the extensometer, the tendency of the extensometer to slip on the specimen is greatly reduced in that the members 15 and 16 do not have to support any substantial weight.

As shown, the extensometer 10 has a mounting block 20 mounted thereon, and this block 20 in turn has a split type clamp portion 21 that fits over a lightweight aluminum tube 22 forming a support arm. The arm 22 in turn extends generally at right angles to the longitudinal axis of the specimen 11, and is attached at its opposite end to a split clamp portion 23 of a mounting block 24. The block 24 also clamps a thin, spring steel flexure strip 25. The flexure stip 25, as shown, extends upwardly from the arm 22 and is mounted in a clamp or block 26 at its upper end. The clamp or block 26 is in turn fixed to a portion of test machine 12A or a support fixed with relation to the test machine frame.

The flexure strip 25, as previously stated is a thin, flexible spring steel member. To achieve the desired position of the arm 22 when the weight of the arm and extensometer are supported by the resilient force from the flexure strip, the flexure strip can be formed into a constant radius prebend as shown in dotted lines in FIG. 1. The dotted line representation is when the flexure strip is unsupported with respect to the arm. The prebend is usually formed with a fixture that has a fixed radius, and the strip is held on this fixture during heat treatment so that when the spring steel strip is completed it will have retained the proper radius. The use of a constant radius is important so that when the extensometer arm is at a horizontal position the strip 25 will be substantially planar as shown in solid lines. The effective lever arm of the support arm 22 can be changed by adjusting the position of this tube or arm in the split clamp 23 to provide for a balancing of the extensometer weight when the arm is held in its horizontal position at right angles to the axis of the specimen 11. The clamp 21 also can be used for adjustment.

Referring to FIG. 4, which is a view showing how the flexure strip 25 permits movement in up and down or axial direction of the specimen 11 during testing. The arm 22 can move up and down and the flexure strip 25 will bend generally to the configuration shown in dotted lines in FIG. 4 to permit this bending. It can be seen that there will be a slight shifting of the arm, and consequently there will be some tendency to tend to rotate the extensometer in pitch about its central axis 30 as indicated by the arrow in FIG. 4. The axis 30 is perpendicular to the longitudinal central axis of tube 22. The small amount of this rotation however can be accommodated by the extensometer support while rigidity against any substantial rotational movement is provided.

In FIG. 5, the ability of the arm 22 to move along its longitudinal axis is illustrated. This direction comprises a first orthogonal direction in a plane perpendicular to the longitudinal axis of the specimen 11. Movement in either direction as indicated by the double arrow 31 will result in bending of the flexure strip across its narrow or transverse dimension near the mounting bracket 26, also shown in dotted lines in FIG. 5. There will also be a slight tendency of the arm to raise to tend to rotate the extensometer slightly about a pitch axis, but again, the amount is very small.

In FIG. 6, a top view of the extensometer is shown, and the ability of the arm 22 to permit the extensometer to move in a second orthogonal direction in a plane perpendicular to the axis of the specimen 11 is shown. Such movement, which would be generally at right angles to the movement shown in FIG. 5, will cause the flexure strip 25 to twist about its longitudinal axis, and because the flexure strip is thin, and relatively long it can twist without exerting any substantial force on the specimen or the extensometer.

It should also be noted that when the extensometer tends to move as shown in FIG. 6, there will be some tendency of the extensometer to rotate in yaw about its axis 32 also shown in FIG. 6. Axis 32 is the effective pivot axis between the arms 13 and 14 of the extensometer. This tendency to rotate in yaw is very minute and can be accommodated.

The overall assembly of the arm 22 and the flexure strip 25 provides substantial resistance to rotation of the extensometer in yaw, pitch, or in roll, which would be generally along an axis parallel to the axis of the tube 22. It can be seen that if the tube 22 tends to twist, this will be resisted by the flexure strip across its full width, and if the extensometer itself tends to rotate in yaw about its axis 32, as shown in FIG. 6, the force from the flexure strip will act through the entire length of the tube 22 to provide a substantial resisting force to this yaw. Likewise, if the extensometer tends to rotate in pitch as shown in FIGS. 4 or 5, the flexure strip 25 resists such movement as a column (such loads would cause it to buckle if the strip were to give), and the resistance force also acts through the length of the tube 22 to provide substantial rigidity to resist rotation of the extensometer itself in pitch about the extensometer axis 30. Thus the mounting assembly permits movement in directions where it is necessary, namely the linear directions of the movement of the specimen, or any combintion of these linear directions, and resists the movements that are undesirable such as the roll, pitch and yaw of the extensometer itself.

In a typical application, the flexure strip may comprise high strength spring steel approximately 0.010 inch thick, in a stip ½ inch wide and approximately 3½ inches long. Such a flexure strip is used to support an MTS Systems Corporation diametral extensometer model 632.18 or 632.20. The support arm 22 is preferably approximately twice the length of the flexure strip 25.

It should be pointed out that if the constant radius prebend is eliminated, a suitable separate spring can be used in combination with a planar flexure strip for holding the weight of the specimen, or a counterweight could be added to the opposite end of the arm 22 from the extensometer to counterbalance the specimen weight. However, this counterweight increases the inertia of the overall system and thus is undesirable.

The support mechanism is lightweight, low cost, and permits the desired movement to insure proper sensing of changes in diameter of the specimen during tests.

The adjustability of the effective length of the arm 22 permits adjustment of the support force to achieve the desired balance of the extensometer weight and correct for slightly different weights and resiliency of the flexure strip.

What is claimed is:

1. A support assembly for an extensometer used for determining changes in a dimension of a test specimen held in a test frame comprising an elongated flexible resilient strip having a first end adapted to be supported with respect to a test frame independently of a specimen with which the support assembly is to be used and having a second end, said flexible strip having a longitudinal axis extending generally in the same direction as the direction of extension of a specimen with which the support assembly is to be used, an elongated support arm, means to physically attach said support arm to said second end of said flexible strip in position extending generally normal to the flexible strip, and means to mount an extensometer independently of a specimen with which the support assembly is to be used at a portion of said support arm spaced from said flexible strip.

2. The support of claim 1 wherein the means to attach the support arm to said flexible strip comprises adjustable means permitting lengthwise adjustable movement of said support arm with respect to said flexible strip.

3. The support of claim 2 wherein said support arm is substantially twice as long as said flexible strip.

4. The support of claim 1 wherein said flexible strip comprises a thin metal strip having a longitudinal length, said strip being formed into a curve from said first end to said second end when at rest, and formed to provide a resilient force tending to counterbalance weight of an extensometer to be mounted at the outer end of said support arm when said strip bends opposite the curve and becomes substantially planar.

5. A support for an extensometer used for determining changes in a dimension of a test specimen held in a test frame comprising an elongated flexible strip having a first end adapted to be supported with respect to a test frame and a second end, said flexible strip having a longitudinal axis extending generally in the same direction as the direction of extension of a specimen with which the support is to be used, an elongated support arm, means to attach said arm to said second end of said flexible strip in position extending generally normal to the strip, and means to mount an extensometer at a portion of said arm spaced from said flexible strip, said flexible strip being of sufficient size to provide a force to counterbalance the weight of an extensometer to be mounted at an outer end of said support arm, and said flexible strip permitting substantially unrestricted movement of said extensometer in a direction axially along said elongated support arm, and in directions generally perpendicular to the longitudinal axis of said support arm.

6. An assembly for supporting an extensometer for sensing dimensional changes of a specimen mounted in a test frame comprising a flexible resilient strip having a longitudinal length, a width transverse to its length, and a thickness, means adapted to mount said strip with respect to a test frame used for applying force to a specimen, an elongated support arm having a longitudinal axis, means to connect said support arm to said flexible strip in position spaced from the means adapted to mount, and separate means at the outer end of said support arm to mount an extensometer thereon, at least one of the two last mentioned means comprising a releasable adjustable member for permitting adjustment in direction along the longitudinal axis of said support arm, said means adapted to mount said strip orienting said strip so that the length of said strip extends generally in the same direction as the direction of force applied to a specimen with which the assembly is to be used and the width of said strip is substantially normal to the longitudinal axis of said support arm.

7. The combination of claim 6 wherein the thickness of said strip is selected to permit bending of said flexible strip transverse to its longitudinal axis and twisting about its longitudinal axis without substantially changing the force exerted by said strip at the outer end of said support arm.

8. The combination of claim 7 wherein said flexible strip provides substantial resistance to rotation of said support arm about the longitudinal axis of said support arm.

9. A method of supporting an extensometer with respect to a test frame applying force to a specimen with which an extensometer is to be used comprising supporting an extensometer on a support arm extending generally at right angle to the direction of force applied to a specimen with which the extensometer is to be used, and supporting said support arm at a location spaced from an extensometer supported on the support arm with a flexible resilient elongated member configured to provide a resilient force on the support arm substantially balancing the weight of the extensometer to support the extensometer independently of the specimen with which the extensometer is being used.

10. The method of claim 9 including the further step of orienting said flexible elongated member to permit said extensometer to move generally in a direction parallel to the direction of force applied to a specimen with which the extensometer is to be used without substantial restraint but to resist the tendency of the extensometer to rotate about an axis perpendicular to the direction of force applied to a specimen with which the extensometer is used.

11. The method of claim 9 including the step of initially forming said elongated member in a curved shape selected so the member is substantially straight when the weight of an extensometer is balanced.

* * * * *